March 2, 1971    W. H. COULTER ET AL    3,567,389
FLUID TRANSFER VALVE STRUCTURE
Filed April 3, 1968      3 Sheets-Sheet 1
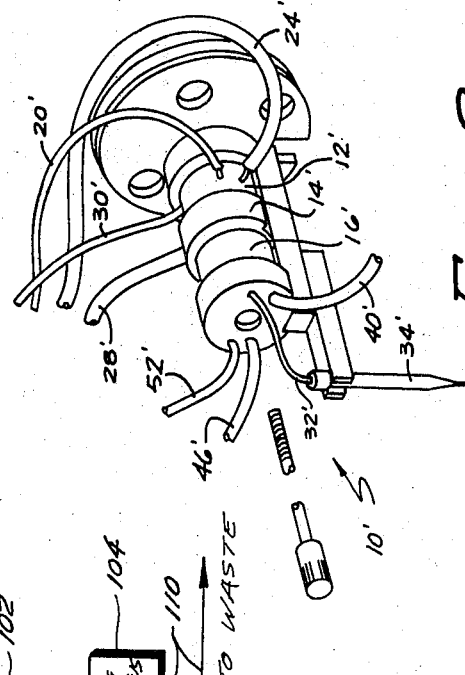
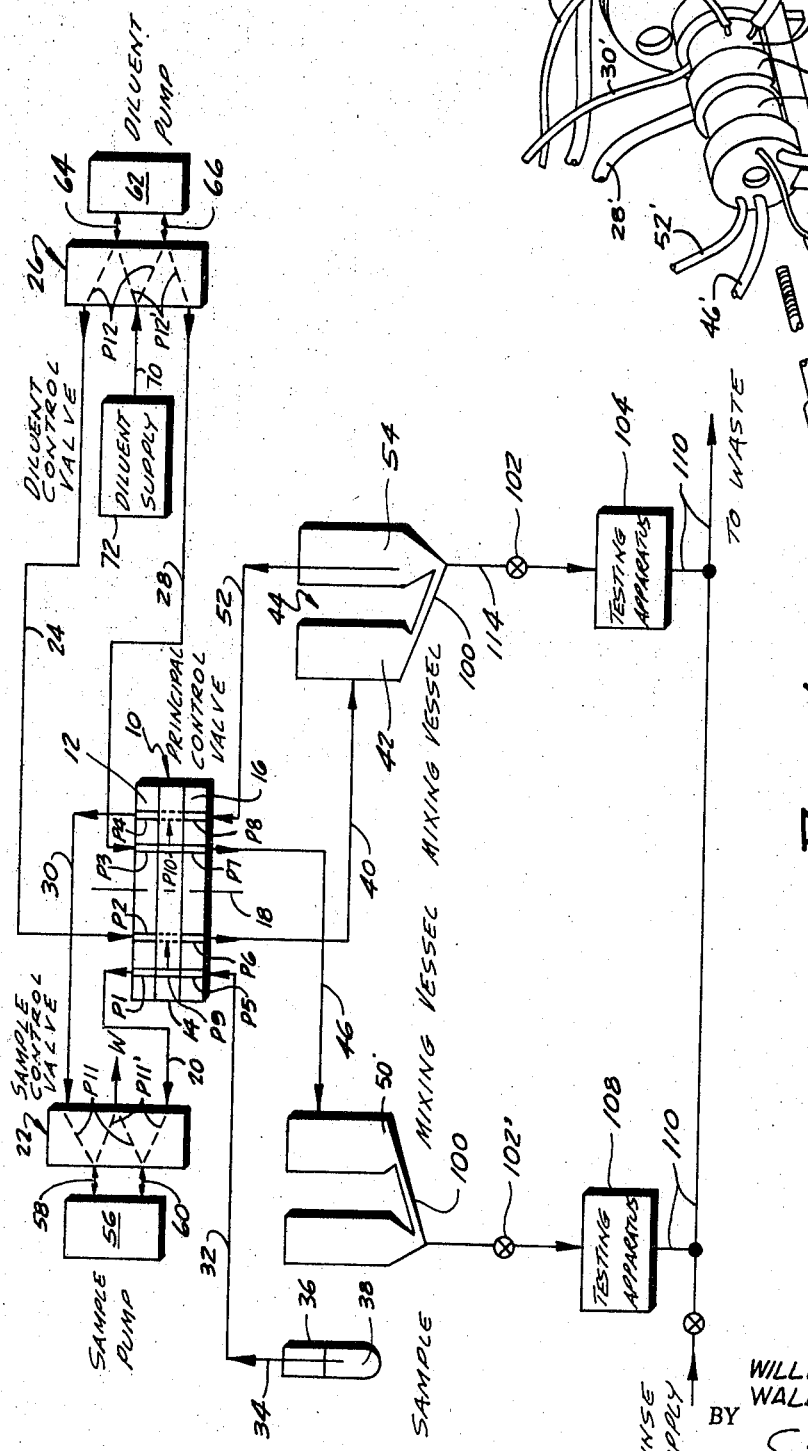
INVENTORS
WILLIAM F. ROTHERMEL
WALLACE H. COULTER
BY
*Silverman + Cass*
ATTORNEYS

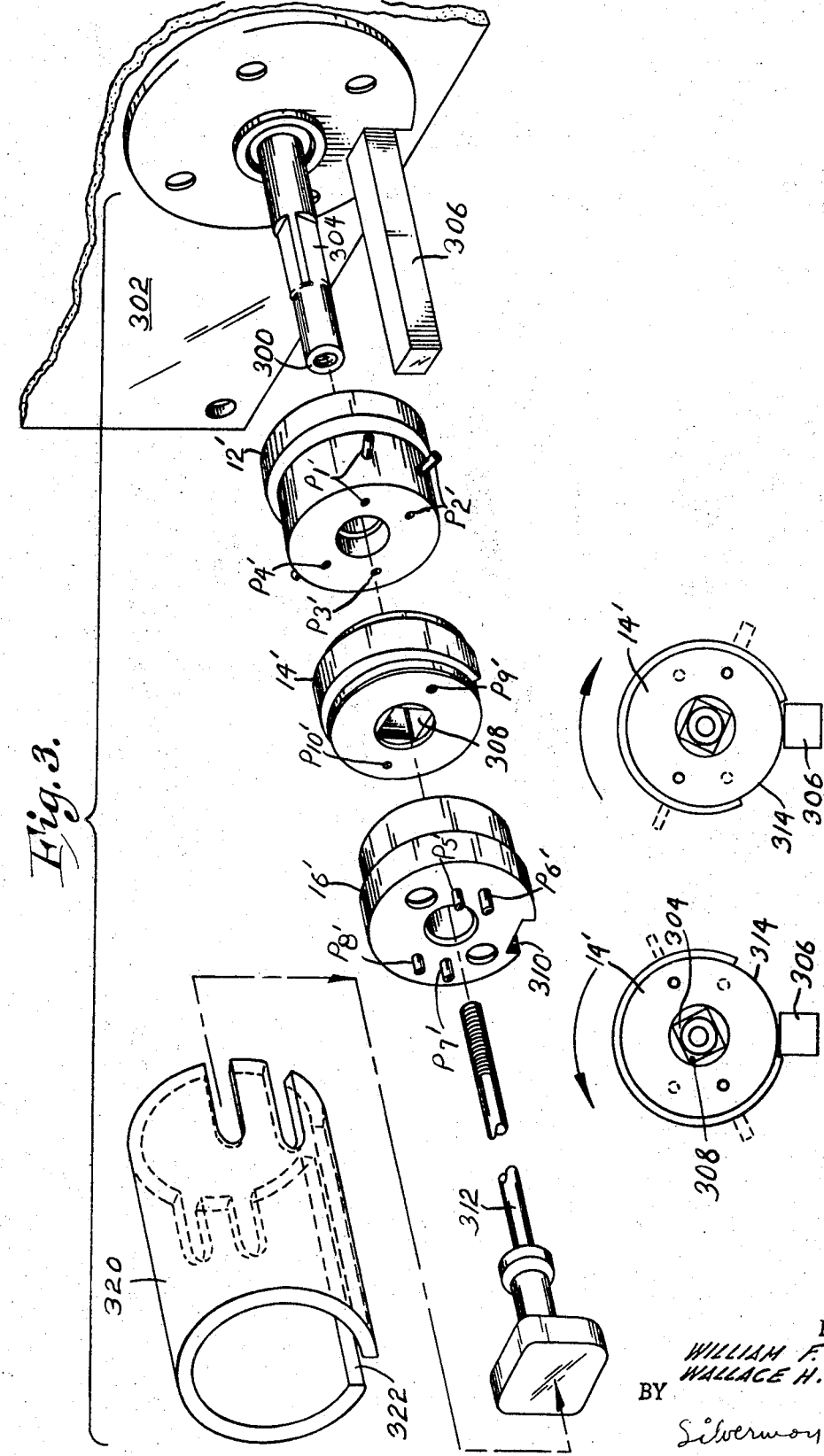

United States Patent Office 3,567,389
Patented Mar. 2, 1971

3,567,389
FLUID TRANSFER VALVE STRUCTURE
Wallace H. Coulter, Miami Springs, and William F. Rothermel, Hialeah, Fla., assignors to Coulter Electronics, Inc., Hialeah, Fla.
Filed Apr. 3, 1968, Ser. No. 718,545
Int. Cl. G01n 1/00
U.S. Cl. 23—253
12 Claims

ABSTRACT OF THE DISCLOSURE

A transfer valve construction for a diluting system which automatically produces one or more sample dilutions of predetermined concentration from a first fluid specimen, while adapted to simultaneously commence dilution of a second fluid specimen before the desired dilutions of said first specimen are completed. The valve including a plurality of members engaged in face-to-face contact, one of which is moveable relative to the remainder of the valve structure and capable of being indexed between a first and a second position. Said valve having a first and second portion for receiving fluid samples, such that when said movable member is indexed a precise amount of said sample is isolated and positioned for combining with a predetermined volume of diluent to produce the requisite dilutions. The valve of the present invention having fluid operated means for biasing the valve members into tight sealing engagement upon the introduction of the liquid specimens and the diluent into said valve but being deenergized to relax said tight engagement during relative movement of the valve members to prolong the work life span of said valve.

CROSS REFERENCE TO RELATED APPLICATIONS

The subject matter of this application is an improvement upon the valve structures disclosed in the following copending applications:
(a) Application Ser. No. 631,284, filed Apr. 17, 1967, and entitled "Automatic Apparatus for Processing of Blood or the Like To Obtain Certain Parameters";
(b) Application Ser. No. 718,605 filed on Apr. 3, 1968, and entitled "Fluid Transfer Valve and Diluting System."

BACKGROUND OF THE INVENTION

The field of the invention herein is broadly that which uses vessels, valves and connecting conduits for the intermixing and/or diluting of fluids primarily for the purpose of making measurements and tests on said fluids. It will be appreciated that this description is somewhat general; however, while the valve structure disclosed in this specification is primarily for use with an automatic instrument and diluting system such as disclosed in the above mentioned copending applications, it is capable of many uses. In medicine, biology, chemistry and allied fields, research as well as routine testing requires the use of apparatus which can produce fluid mixtures of specific concentrations accurately and automatically, viz., one part fluid sample to a predetermined quantity of diluent or chemical substance.

In recent years so-called automatic chemistry apparatus has become popular, especially where testing and measurements are to be done on a continuous production basis, with many tests to be made simultaneously and complex routines to be repeated, but with different samples. The above noted copending application Ser. No. 631,284 is of this type, and it is primarily intended for the measurement of parameters of blood.

In that apparatus, samples of whole blood may be introduced, one every fifteen seconds, and the apparatus performs the requisite dilutions, tests and computations needed for obtaining blood counts of white and red cells, a hematocrit determination, a hemoglobin measurement, and so on. In the case of blood sampling, multiple dilutions must be made, red cells must be lysed for making white cell determinations, liquids must be pumped, transferred and moved between vessels. The manual techniques which are classically used in conventional work are not satisfactory, and obviously the vessels and equipment of the ordinary laboratory are not suitable for automated apparatus. Thus, there is disclosed in said copending applications valve structures which can be used to quickly and accurately prepare the necessary sample suspensions of predetermined concentration for transfer to the testing apparatus of the instrument.

The aforementioned transfer valve structures include at least one member sealingly engaged with and movable relative to the remainder of the valve to subtend a precise amount of fluid from one fluid path and position same in a second path for combining with a diluent. In the transfer valves of said copending applications spring arrangements are employed to provide a constant force tending to bias the valve elements into fluid tight engagement. But, it should be clear that the assurance of fluid tight engagement is necessary only during the periods when fluid specimens or diluent are being introduced into the valve. During the periods of indexing of the relatively movable valve member the pressure in the fluid lines is at a minimum, and there is little need for the rather severe compressive sealing forces set up by the spring arrangement. In fact, the forces do more harm than good in that they increase the wear on the bearing surfaces and shorten the work life of the valve.

According to the invention, an important object is the provision of a transfer valve arrangement for diluting apparatus which employs means to reduce the wear on the bearing surfaces during operation of the valve.

Another object of the invention is the provision of a transfer valve which employs a selectively operable fluid piston arrangement to maintain the valve parts in tight sealing engagement when liquid is being introduced into the valve.

BRIEF DESCRIPTION OF THE DRAWINGS

FIG. 1 is a schematic block flow diagram of a diluting system of the type in which the present invention is designed to function.
FIG. 2 is a perspective view of a transfer valve assembly which is illustrated schematically in FIG. 1.
FIG. 3 is an exploded perspective view of the transfer valve of FIG. 2.
FIGS. 4 and 5 are somewhat diagrammatic plan views showing the two positions of the center member of the transfer valve of FIGS. 2 and 3.

DESCRIPTION OF PREFERRED EMBODIMENTS

Figure 6:
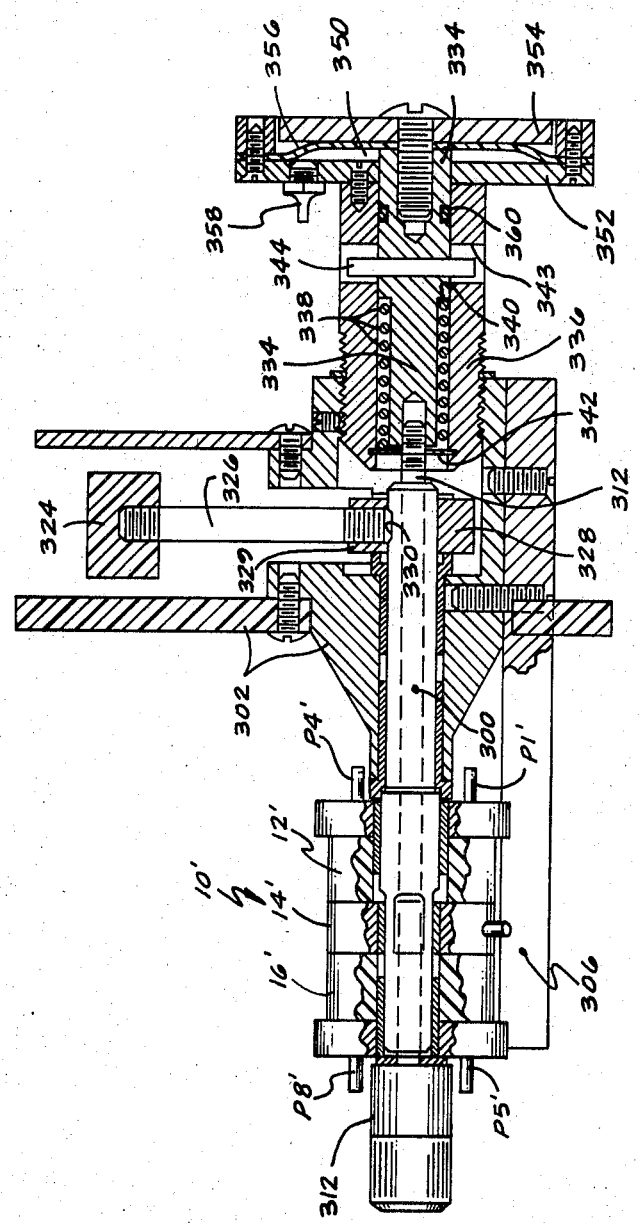
FIG. 6 is a partial sectional view of a complete transfer valve according to the present invention, and illustrating the piston arrangement for controlling the sealing forces exerted on the respective valve elements.

At the outset it would be convenient to outline the general scheme of a diluting system in which the instant invention may be used, by explaining the functions which are performed.

A fluid sample is obtained in any convenient manner. A tube or snorkel is dipped into the sample and draws a quantity into the fluid transfer valve of the system. A minute measured part of the sample is then diluted with a predetermined quantity of diluent. The resulting suspension is then transferred to first testing apparatus of the automatic instrument wherein one or more tests or operations may be performed thereon. After the first test or series of tests are performed, a portion of the sample solution is again drawn into the fluid transfer valve and a second diluting operation is performed by introduction of a predetermined quantity of diluent. The resulting suspension is then transferred to second testing apparatus wherein the required tests etc. are performed.

In the transfer valve embodiments and diluting system disclosed in the aforementioned copending application two diluting operations are employed and the resulting suspensions are transferred to testing apparatus operating on the Coulter particle analyzing principle disclosed in U.S. Pat. No. 2,656,508. It should be understood that with regard to the instant invention this is merely by way of illustration, and does not so limit said invention.

Looking now at FIG. 1, the diagram illustrates schematically a diluting system of the type in which the present invention may be used. A diagrammatic representation of the control or transfer valve for the careful measurement of the sample is shown at the top left of the diagram and is designated generally by the reference character 10. Preferably, it is formed of three elements 12, 14 and 16 with the center element 14 sandwiched between the two outer elements but swingable relative thereto in a manner to be described briefly hereinafter.

The sandwiched or central element 14 is a carefully made and highly accurate structure having conduits P9 and P10, each on opposite sides of a central pivot about which it is adapted to swing. Each of these conduits is designed to carry a precise quantity or volume of some fluid, and upon movement between positions, there being two such positions, will slice off or subtend within itself the said volume of fluid and pass it or transfer it. This function is represented by the arrows showing the alignment of the center conduits with others carried by the sandwiching members 12 and 16 of the valve 10.

The outer members 12 and 16 are fixed relative to one another, and each member has two pairs of ports or passageways. These are designated P1, P2, P3 and P4 in member 12, and P5, P6, P7 and P8 in member 16. When the center element 14 is in one position, say the first, the left hand conduit or passageway P9 is aligned with the passageways P1 and P5 at the same time that the right hand conduit or passageway P10 is aligned with the passageways P3 and P7. If the center element or member 14 is swung upon the pivot designated symbolically by the broken line 18, to the second position, the passageways P9 and P10 will move to the positions shown by the broken lines in the direction indicated by the arrows, that is, to the right in FIG. 1, blocking off further flow between the passageways P1 and P5 and between the passageways P3 and P7, while aligning the passageway P9 with the passageways P2 and P6 and aligning the passageway P10 with the passageways P4 and P8.

This action can be reversed, and its effect is to slice or subtend a precise volume of fluid out of the one path and enable it to be inserted into the other path while blocking off the first path. This is done at both ends of the transfer valve 10, which, for purposes of clarity must be distinguished from the sample and diluent control valves to be discussed hereinafter. Accordingly, it can be seen that transfer valve 10 is comprised of two portions of like construction, one being to the right of line 18 and the other to the left.

Various fluid lines connect the valve assembly 10 with the other elements of the system and for purposes of reference they are as follows:

(1) Fluid line 20 connects from passageway P1 to the bottom end of the sample control valve 22.

(2) Fluid line 24 connects from the passageway P2 to the upper end of the diluent control valve 26.

(3) Fluid line 28 connects from the passageway P3 to the lower end of the diluent control valve 26.

(4) Fluid line 30 connects from the passageway P4 to the upper end of the sample control valve 22.

(5) Fluid line 32 connects from the passageway P5 to the sample snorkle 34. Note that this snorkle is shown dipping into a vessel 36 containing a liquid sample 38, the vessel 36 being any suitable construction, preferably with some form of identification.

(6) Fluid line 40 connects from the passageway P6 to chamber 42 of the mixing vessel 44.

(7) Fluid line 46 connects from the passageway P7 to chamber 48 of vessel 50.

(8) Fluid line 52 connects from the passageway P8 to the chamber 54 of vessel 44. This line is sometimes called a thief.

Looking for the moment at the overall system disclosed it will be noted that there is a sample pump 56 connected by the lines 58 and 60 to the sample control valve 22, and a diluent pump 62 connected by the lines 64 and 66 to the diluent control valve 26. Both of the control valves 22 and 26 are three-way valves, with the internal alternate paths being shown schematically by slanted arrows. The path pairs are P11 and P11' in the valve 22 and the pairs P12 and P12' in the valve 26. In the case of the valve 22, the center paths go to waste designated W, and in the case of the valve 26, the center paths connect with a line 70 extending from a diluent supply 72.

The pumps 56 and 62 may be of any construction, but preferably are manifolds having positive displacement pistons in them, moving from end to end and thereby displacing a volume of fluid. Each pump draws into itself at one end the same volume of fluid it is pushing out at the other end.

If it is assumed that the transfer valve 10 is in the condition shown in FIG. 1 with the center element 14 disposed so that the solid line portions of the conduits P9 and P10 are on the left aligned with the passageways shown, operation of the sample pump 56 by movement of its piston from bottom to top while the two paths P11' of the valve 22 are in use will enable a quantity of the liquid sample 38 to be drawn into the line 32 and 20 by way of the aligned passageways P1, P9 and P5. At the same time, any liquid which may have been in the upper end of the sample pump 56 is expelled to waste W by way of the line 58. The passageways P11 are blocked off at this time. The sample 38 fills the passageway P9 and when the center element 14 is moved to its alternate position, represented by the broken line position of the passageway P9, the volume of sample subtended will be aligned with the passageways P2 and P6.

The line 24 connects passageway P2 with the upper end of the diluent control valve 26, and prior to movement of the center element or member 14 to the second position, the solid portion of element 14 prevents communication between passageways P2 and P6. After movement of the center element 14 is completed, and passageway P9 is aligned with passageways P2 and P6 the control valve 26 is automatically operated to dispense a predetermined volume of diluent for making the first dilution or sample suspension of predetermined concentration.

The plug or subtended portion of sample 38 and diluent from the line 24 pass through the line 40 into chamber 42 of vessel 44. It will be appreciated that there is diluent in the line 40 ahead of the plug of sample 38 as well as behind it, derived from the line 24. Thus, the motion of the fluid entering vessel 44 effects a mixing operation. The total amount of liquid which flows into the mixing vessel 44 is equal to that displaced by pump 62. This is an accurately controlled amount, 10 cc. for example, and it pushes the plug of sample 38 into the chamber 42, washing out the aligned passageways P2, P9 and P6. The volume of the plug of sample 38 is determined by volume of the conduit P9, its exact volume being sufficient to produce the proper desired concentration, i.e., a 250 to 1 dilution.

The vessel 44 which is illustrated as having chambers 42 and 54, is completely empty when the sample commences to enter; the respective chambers being joined by conduit 100. Accordingly, while valve 102 remains closed the sample solution will fill chamber 54, and upon opening said valve 102 the sample solution will pass into the first testing apparatus 104.

At some time prior to the opening of valve 102, but after chamber 54 is filled to a pre-selected level, sample control valve 22 is shifted to align the internal passageways 11 with the lines 58 and 60, thereby connecting the line 30 with the passageways P4, P10 (the transfer valve assembly is in position No. 2) and P8. Accordingly, since line 52 dips into the dilution or sample suspension in chamber 54 and is connected to P8, actuation of the sample pump 56 draws a portion of the dilution into aligned passageways P4, P10 and P8. It should be noted that this movement purges the opposite end of the pump and any portion of sample 38 contained therein is expelled to waste.

A small plug of the dilution (concentration: one part fluid sample to about 250 parts diluent) is contained in the passageway P10 in position 2. Next, the center element 14 is indexed back to position No. 1 which realigns conduit P9 with passageways P1 and P5 and subtends a plug of the first dilution in passageway P10 and aligns and deposits same in passageways P3, P7. When position No. 1 has been reached, the diluent control valve 26 is operated to move to the position where it is arranged to dispense diluent by way of line 28. Diluent pump 62 is then automatically operated to force a predetermined amount of the diluent through the line 28, passageways P3, P10 and P7, and the line 46 into the vessel 50 to produce the second dilution, having determinable concentration.

It should be noted that vessels 50 and 44, as illustrated, are of the same type, employing a two-chamber construction; however, such need not be the case, and it is envisioned that single chamber vessels may be used. The same procedure for mixing goes on in vessel 50 as described in the case of the vessel 44. In passing through the fluid passageways and lines described, the diluent from the control valve 26 pushed the plug of the first dilution out of the passageway P10 and rinses that passageway.

Once the second dilution is received in vessel 50, the valve 102' may be operated automatically to transfer a portion of the second suspension to the second testing apparatus, designated generally 108. As illustrated in FIG. 1, once the various testing operations have been performed the sample suspension enters line 110, and is rinsed or otherwise transported to waste.

To review briefly the operation of the device, initially the condition of transfer valve 10 is that it is disposed in position No. 1, and a quantity of fluid sample 38 is drawn into conduit P9. Upon movement of the center 14 to position No. 2 a slug of fluid sample 38 is subtended and mixed with a predetermined volume of diluent to produce the first dilution. Next, with center element still in position No. 2, a quantity of the first sample suspension is drawn into conduit P10. Upon movement of the element 14 back to position No. 1, a slug of the first suspension is subtended and mixed with a predetermined volume of diluent to produce a second sample suspension. Thus, when it is kept in mind that a continuously operating, automatic diluting apparatus is envisioned it can be seen that when the center element 14 is indexed from position No. 2 back to position No. 1 to produce a second dilution with regard to a first fluid sample, another fluid sample will be drawn into conduit P9 in preparation for the first diluting operation.

Turning now to FIGS. 2 and 3, there is illustrated a commercial or actual form of the transfer valve structure 10 shown schematically in FIG. 1, and capable of being used with the hereinbefore discussed diluting system. Since many elements of the actual embodiment of the valve illustrated in FIGS. 2 and 3 correspond to those of the previously discussed diagrammatic representation, these elements will be designated with like reference characters, primed.

The valve 10' includes an intermediate or center element 14' movable with respect to stationary outer elements 12' and 16'. The element 12' has passageways P1', P2', P3' and P4' formed therein, while the element 16' carries the passageways P5', P6', P7' and P8'. The intermediate or center element 14', like the center element 14, of the previously discussed embodiment, has conduits P9' and P10' formed therein.

The operation of the transfer valve 10' and the alignment of the respective passageways are identical to those same operations occurring in the valve 10, previously discussed, said discussion being incorporated herein by reference. In this regard, the fluid lines illustrated in FIG. 2, bear primed reference characters corresponding to those of the fluid lines discussed in regard to the general concept of the invention schematically illustrated in FIG. 1.

The elements 12', 14' and 16' are cylindrical members with centrally disposed mounting apertures. Accordingly, instead of having the respective valve portion to the right or left of axis 18, as in valve 10, the first and second portions of valve 10' are diametrically opposed with respect to the axis of the mounting spindle 300.

Considering FIG. 1 by way of comparison, and, viewing FIG. 3, the elements 12', 14' and 16' are supported by a spindle or shaft 300 which extends out of a stationary mounting plate 302. Spindle 300 is rotatable relative to the stationary mounting plate 302, and while primarily of cylindrical configuration, said spindle includes a portion 304 of rectangular cross section disposed axially inward of the spindle end. In addition, mounting plate 302 carries a stationary rectangular block-like member 306, as illustrated.

In the assembled state, the respective elements 12', 14' and 16' are disposed or strung on spindle 300 such that elements 12' and 16' with their circular mounting apertures engage the cylindrical portions of the spindle, while intermediate element 14' with its rectangular mounting aperture 308 is received by the rectangular spindle portion 304. The respective valve elements are held in assembly on spindle 300 by bolt 312, the threaded end of which passes through spindle 300 and is engaged in or by a spring-biased nut arrangement on the opposite side of plate 302, see FIG. 6. The effect of this construction is that spindle 300 is free to rotate relative to plate 302 and bolt 312, while the spring-biased nut arrangement, FIG. 6, tends to force the juxtaposed surfaces of the valve elements into fluid-tight contact.

To provide for the requisite movement of the intermediate element 14' relative to outer elements 12' and 16', said last named outer elements are each provided with a notch 310. The respective notches 310, of which only that in element 16' is visible in FIG. 3, closely receive the stationary member 306 and thus preclude movement of the outer members relative thereto. Intermediate element 14' is provided with a notch 314 of considerable circumferential length which also receives member 306; accordingly said element is free to move with respect to member 306, within certain defined limits.

Thus, when valve 10' is assembled as discussed above it is believed clear that rotary movement of spindle 300 will cause the intermediate element 14' to rotate therewith and relative to outer valve elements 12' and 16', due to the disposition of rectangular portion 304 in the like-shaped aperture 308. Since this rotary movement is limited by the engagement of member 306 in notch 314, two positions are defined. The first is illustrated in FIG. 4, and corresponds to the previously discussed position No. 1, while the second position FIG. 5, corresponds to position No. 2 discussed above.

In addition, a cover or shield 320 is illustrated in FIG. 3. The shield 320 is engaged telescopically over the valve 10', with the slotted portion 322 receiving the member 306. With the shield 320 in place any spray or leakage during the operation of the valve is confined.

Preferably, as is disclosed in the aforementioned copending applications the bearing surfaces of valve elements 12' and 16' are comprised by synthetic resin members. Accordingly, said resin members cooperate with the highly polished bearing surfaces of the central element 14' to provide smooth, low friction operation. While this arrangement has proved satisfactory for most uses the bearing surfaces have exhibited wear after a great number of operations and will tend to leak in time.

Accordingly, the present invention improves upon the prior valve structures by providing means to reduce frictional wear and thereby prolong the life of the valve. The structure for achieving this result is illustrated in FIG. 6.

Turning now to FIG. 6, the transfer valve arrangement illustrated therein is designated 10', but it should be noted that the construction of the mounting plate 302 has been changed somewhat to provide for the alternate positioning of the ports P1' to P4', as shown. In addition, FIG. 6 also illustrates the means for effecting rotation of the spindle 300.

On the opposite side of plate 302 from that illustrated in FIG. 3 there is provided a cylinder arrangement having a piston follower 324 which is reciprocated along a path perpendicular to the plane of the paper. To operatively connect the piston follower 324 with spindle 300 there are provided a connecting rod arrangement 326 and collar 328.

The connecting rod 326 is coupled operatively to the piston follower 324 by a universal-type joint (not shown) of any desired configuration. Collar 328 is received over the end of spindle 300 and is provided with a threaded aperture 329 in which is engaged the threaded end of rod 326. Spindle 300 has a flattened portion 330 against which the end face of rod 326 is disposed to connect the respective member for joint movement. Accordingly, it can be seen that as piston follower 324 reciprocates spindle 300 will rotate thus imparting rotative movement to central element 14'.

As was discussed previously, the threaded end of bolt 312 engages a piston type member, which is designated 334. The piston member 334 is carried slidably by an outer housing 336, and interposed between the piston member and the inner wall of the housing is a spring 338. The piston member 334 and the housing 336, each are provided with an annular shoulder, 340 and 342 respectively, against which spring 338 bears. Thus, the spring 338 will tend to bias the piston member 334 to the right, out of the housing 336.

To limit the movement of piston member 334, the housing 336 is provided with a radial groove 343 and the piston is traversed by a pin 344. Thus, the engagement of the pin 344 with the walls of the groove 343 define the limits of movement of the said piston member.

Due to the engagement of bolt 312 with the piston member 334 and the outer valve member 16', the force of spring 338 tends to hold the valve elements in assembly. It should be noted that spring 338 is not of sufficient strength to provide the tight sealing engagement that is desired when fluid under pressure is being introduced in to valve 10; but rather, is chosen to provide only the necessary sealing effect to prevent leakge during movement of the central member 14'.

To augment the action of spring 338 and provide the force necessary to achieve a tight sealing engagement, the end portions of the piston 334 and the housing 336 are constructed to define a fluid chamber 350. In this regard, annular flange members 352 and 354 are provided on the end of the housing 336, and the piston member 334, respectively. Interposed between said flange members 352 and 354 is a diaphragm 356, as illustrated, which seals one end of the chamber 350. To seal the other end of said chamber 350, the piston member 334 includes annular sealing means 360 which engages the inner surface of housing 334. Flange member 352 is provided with a valve 358 so that fluid pressure may be introduced into the piston chamber 350 which will tend to force the piston member 334 to the right, and by way of the bolt 312 biases the valve member 12', 14' and 16' into tight sealing contact. Accordingly, when the transfer valve of the present invention is employed with an automatic diluting system, the programming means for the system may be used to introduce fluid into chamber 350 at the appropriate time.

Briefly, with reference to the preceding description of the diluting system of FIG. 1, the operation of the valve structure of FIG. 6 is as follows. During that portion of the diluting cycle when a liquid specimen is drawn into conduits P9 or P10, or when diluent is being introduced into the valve 10; 10', fluid is introduced into chamber 350 to cause the piston member 334 to move axially and correspondingly forces the valve elements 12', 14' and 16' into tight sealing engagement. Immediately prior to the indexing of the central member 14' from position No. 1 or position No. 2, the fluid pressure in chamber 350 is automatically lowered thereby reducing the force tending to bias the valve elements together. Thus, the indexing of central number 14' will take place when the frictional forces between the interengaging surfaces are at a minimum; accordingly, materially reducing the wear on the respective bearing surfaces and increasing the work life of the valve.

It is believed apparent that considerable variations and substitutions of equivalents are capable of being made without in any way departing from the spirit and scope of the invention as defined in the appended claims.

In this regard it is envisioned that various types of fluid operated piston constructions may be employed to produce the proper sealing engagement. For example, in place of the illustrated arrangement which employs a spring, a double acting fluid piston arrangement may be utilized.

What it is desired to secure by Letters Patent of the United States is:

1. A transfer valve assembly for use in a diluting system, said assembly comprising: a valve structure having a plurality of valve elements in face-to-face contact, at least one of said elements being movable relative to the remainder of the structure; a conduit formed in one of said valve elements, and a plurality of ports formed in the remaining structure and defining at least two fluid paths; whereby, said conduit may be placed in communication with a first one of said fluid paths and a fluid sample introduced therein, relative movement of said valve elements subtending an amount of fluid and transferring same from said first fluid path to a second fluid path by way of said conduit; the improvement wherein, said valve assembly includes means for biasing the valve elements into tight sealing engagement upon the introduction of fluid into the valve, but operable to relieve said tight engagement during relative movement of the valve members to prolong the work life span of the valve.

2. A valve assembly as defined in claim 1 wherein said means include a piston chamber and a piston member slidably disposed therein, said piston member being coupled with said valve elements and operable to bias said valve elements into tight sealing contact.

3. A valve assembly as defined in claim 2 further including a spring which exerts a constant force tending to hold said valve elements in assembly, to thereby permit relative movement of the valve elements without leakage when said piston member is not forcing the valve elements into tight sealing contact.

4. A valve assembly as defined in claim 1 wherein said means comprises: an outer housing, a piston member slidably carried by said housing, sealing means associated with said housing and said piston member to define a fluid chamber, said piston member being coupled to said valve elements, such that upon the introduction of fluid under pressure into said chamber the piston will move axially to force the valve elements into tight sealing contact.

5. A valve arrangement as defined in claim 4 wherein said sealing means includes a flexible diaphragm attached to both the housing and the piston member.

6. A transfer valve assembly for use in a diluting system or the like, said assembly including; a valve structure comprising, a central member, a pair of outer members engaged against the opposite faces of said central member in face-to-face contact, said central member being movable relative to said outer member and having at least one conduit formed therein, a plurality of ports in said outer members defining at least two fluid paths, said conduit adapted to be placed in communication with a first one of said paths whereby a portion of a fluid specimen may be introduced into said conduit, indexing of said central member subtending an amount of the specimen and upon the aligning of said conduit with a second one of said fluid paths depositing said amount therein, and means for biasing the valve elements into tight sealing engagement during the introductoin of fluid into said valve, said means being operable to relax said engagement to minimize the frictional forces during movement of said central member.

7. A valve arrangement as defined in claim 6 wherein said outer valve elements include synthetic resin portions which are in face-to-face engagement with the central member.

8. A valve as defined in claim 6 wherein the valve arrangement further includes; a stationary mounting plate having a spindle rotatable relative thereto, said spindle having a non-circular portion disposed between a pair of circular portions, said outer members each having a central, circular mounting aperture while the central member has a non-circular mounting aperture corresponding in shape to said non-circular portion of the spindle, said outer and central member being engaged upon the spindle with their respective mounting apertures receiving similar shaped portions thereof, and a bolt disposed within said spindle which is rotatable relative thereto, one end of said bolt having a head engaged against one of said outer members and cooperating with said mounting plate to hold the valve elements in assembly, the other end of said bolt being coupled to said means for biasing the valve elements into tight sealing engagement.

9. A valve assembly as defined in claim 6 wherein said means includes a piston chamber and a piston member disposed therein, said piston member being coupled with said valve elements and operable to bias said valve elements into tight sealing contact.

10. A valve assembly as defined in claim 9 further including a spring which exerts a constant force tending to hold said valve elements in assembly, to thereby permit relative movement of the valve elements without leakage when said fluid operated piston is not in use.

11. A valve assembly as defined in claim 6 wherein said means comprises: an outer housing, a piston member slidably carried by said housing, sealing means associated with said housing and said piston member to define a fluid chamber, said piston member being coupled to said valve elements, such that upon the introduction of fluid under pressure into said chamber the piston will move axially to force the valve elements into tight sealing contact.

12. A valve assembly as defined in claim 11 wherein said sealing means includes a flexible diaphragm attached to both the housing and the piston member.

References Cited
UNITED STATES PATENTS

| | | | |
|---|---|---|---|
| 3,012,863 | 12/1961 | Feichtmer | 23—259X |
| 3,192,968 | 7/1965 | Baruch et al. | 23—259X |
| 3,192,969 | 7/1965 | Baruch et al. | 23—259X |
| 3,193,358 | 7/1965 | Baruch | 23—253 |
| 3,193,359 | 7/1965 | Baruch et al. | 23—253X |
| 3,408,166 | 10/1968 | Natelson | 23—253 |
| 3,421,858 | 1/1969 | Quinn | 23—259X |

MORRIS O. WOLK, Primary Examiner

R. E. SERWIN, Assistant Examiner

U.S. Cl. X.R.

23—259; 73—421; 137—247.13, 248